United States Patent Office 2,848,301
Patented Aug. 19, 1958

2,848,301

SEPARATION OF PLUTONIUM HYDROXIDE FROM BISMUTH HYDROXIDE

George W. Watt, Austin, Tex., assignor to the United States of America as represented by the United States Atomic Energy Commission No Drawing. Application June 21, 1948
Serial No. 34,353

11 Claims. (Cl. 23—14.5)

This invention is concerned with an improved method of separating plutonium from certain contaminating elements.

The word "plutonium" as hereinafter used in the specification and claims refers to the element of atomic number 94 and to the compounds thereof, unless the context indicates clearly that plutonium is referred to in its metallic state.

Plutonium is normally produced by the neutron-irradiation of uranium in a pile type reactor. The neutron-irradiated uranium mass is usually removed from the pile reactor when only several hundred parts per million of the uranium present has been converted to plutonium. The mass then will also contain a few hundred parts per million of fission products. These are elements having atomic numbers from about 32 to 64, which are produced by the fission of such isotopes as $U^{235}$ and $Pu^{239}$. The separation of the plutonium from the neutron-irradiated mass is a very difficult operation, not only because of the low concentration of the plutonium in the mass, but also because of the presence of the great variety of fission products, many of which are highly radioactive.

One process which has been devised for separating plutonium from neutron-irradiated uranium and the fission products contained therein is known as the bismuth phosphate process. The basis of this process is the fact that bismuth phosphate carries plutonium ions in the lower valence states (tri- or tetravalent) from a solution in which the plutonium may be present in very dilute concentration, but does not carry plutonium ions in the higher valence state (hexavalent) from solution. In general, the process consists of forming an aqueous acidic solution of neutron-irradiated uranium, carrying the plutonium from said solution with a bismuth phosphate precipitate leaving the uranium in its higher valence state and such fission products as are not carried by bismuth phosphate in the solution, dissolving the bismuth phosphate-plutonium carrier precipitate in an aqueous acidic solution, oxidizing the plutonium to the hexavalent state, and then forming a bismuth phosphate precipitate in the solution and separating it therefrom. The bismuth phosphate and such fission products as are carried by bismuth phosphate are thus removed from the solution containing the plutonium. The plutonium may then be reduced to the lower valence states, and the cycle may be repeated as often as necessary to free the plutonium of uranium and fission products. The plutonium which is now contained in dilute concentration in an aqueous acidic solution, together with some residual bismuth ions, is concentrated by precipitating the plutonium as the hydroxide together with a bismuth hydroxide carrier and dissolving the plutonium-bismuth hydroxide precipitate in a small volume of an aqueous acidic solution. The plutonium may be in the tri-, tetra-, or hexavalent state when so carried, but is usually in the tetravalent state. The concentration step is then completed by separating the plutonium from the bismuth. This is usually accomplished by precipitating the plutonium in the hexavalent state as sodium plutonyl acetate or by precipitating the bismuth (as the phosphate) from the solution while the plutonium is in the hexavalent state. This concentration step has certain disadvantages, however, in that it usually requires several cycles of precipitations to effect a quantitative separation of the plutonium and bismuth. The dissolution of the entire bismuth-plutonium hydroxide precipitate and the several cycles involved also reduce the concentration of the plutonium in the final solution.

It is an object of the present invention to provide a convenient and efficient method of separating plutonium hydroxide from bismuth hydroxide.

An additional object is to provide a process for separating plutonium hydroxide from bismuth hydroxide wherein the plutonium is obtained in a concentrated form by a simplified process.

A further object is to provide a novel and useful composition of matter.

Broadly, this invention comprises treating a mixture of bismuth and plutonium hydroxides with a reducing agent having a potential sufficient to reduce the bismuth present to the metallic state, but insufficient to reduce the plutonium to the metallic state, and then separating the plutonium hydroxide from the mixture of plutonium hydroxide and bismuth with a solvent suitable to dissolve the plutonium hydroxide but not the bismuth metal. It will be readily seen that this process will result in a concentration of plutonium since only the plutonium hydroxide is dissolved rather than the mixture of plutonium and bismuth hydroxides. An additional advantage lies in the fact that the plutonium will be obtained in a relatively pure form by a process requiring only two steps.

In one embodiment of this invention the usual steps of the bismuth phosphate process for separating uranium and fission products are carried out until the plutonium is obtained in the tetravalent state in a solution also containing bismuth ion but substantially free from uranium and fission products. The bismuth and plutonium ions present in said solution are then caused to precipitate by introducing an alkali hydroxide into the solution. Precipitation will normally commence when the pH of the solution reaches 2.5 and will usually be completed when the addition of the alkali hydroxide has increased the pH to approximately 3.5. This bismuth phosphate precipitate which carries substantially all of the plutonium as the hydroxide is then separated from the solution by centrifugation, decantation, or filtration. Tetravalent plutonium hydroxide has a solubility of less than 0.002 gram of plutonium per liter at a pH of 2.5 so that it is substantially completely separated from the solution by precipitation. The tri- and hexavalent plutonium hydroxides are insoluble under these conditions so that these also will be carried by the bismuth hydroxide should they be present.

By the process of this invention, this plutonium hydroxide-bismuth hydroxide composition is then treated with a reducing agent suitable to reduce the bismuth to the metallic state but not the plutonium. The reduction potential involved in the reduction of bismuth hydroxide to metallic bismuth in basic solution under standard conditions is 0.46 volt. It has been determined that plutonium is more electropositive than thorium so that the potential for the reduction of trivalent plutonium to the metallic state may be assumed to be more positive than 2.64 volts. Any reducing agent having a potential between 0.46 and 2.64 may therefore be used to reduce the bismuth in the hydroxide composition to the metallic state without reducing the plutonium to the metal. Such standard reducing agents as zinc, sulfite ion, and hydroxylamine are suitable. An alkali metal stannite, such as sodium stannite, has been found to be particularly desirable.

The treatment of the hydroxides can be effected by introducing the hydroxides into a solution of the reducing agent, by passing the reducing agent through a bed of the hydroxides, or by any other standard procedure. The action of the reducing agent results in the formation of a composition of metallic bismuth and plutonium hydroxide. This composition has been found to have utility in the production of polonium by the neutron-irradiation of bismuth, and so the process of this invention may be terminated at this point if this composition is desired.

The metallic bismuth-plutonium hydroxide composition obtained as an end-product of the bismuth phosphate separation process normally contains about 98.6% of bismuth and 1.4% of plutonium hydroxide. The process may, however, result in a composition containing between about 0.1% and 10% plutonium, and any such composition is entirely satisfactory for this use. If, however, it is desired to separate the plutonium from the bismuth, the composition of bismuth and plutonium hydroxide is next treated with a solvent that dissolves the plutonium hydroxide but not the metallic bismuth. Many such solvents are available including the dilute mineral acids, such as nitric, sulfuric, and hydrochloric, the other halogen acids (except hydrofluoric), $S_2Cl_2$ with excess $Cl_2$, and $CCl_4$. Dilute nitric acid, for example from 1 to 2 N, has been found to be a most suitable solvent.

Now that this invention has been described it may be further illustrated by the following specific example.

EXAMPLE

A 20-milliliter solution containing 209 milligrams of $Bi^{+3}$ ions and 101,400 counts per minute of plutonium in 5 N nitric acid was prepared. A precipitate was then formed by adding 6 N $NH_4OH$ to the solution until precipitation was completed, and the precipitate was then permitted to digest overnight. The precipitate which contained bismuth and plutonium hydroxides was then separated from the solution by centrifugation and washed twice with water. The precipitate was then treated with about 5 milliequivalents of freshly precipitated sodium stannite whereby the bismuth hydroxide was converted to the metallic bismuth. The mixture of bismuth and plutonium hydroxide was then washed with an additional 2 milliequivalents of $Na_2SnO_2$ and twice with 3 milliliters of 1 N $NH_4OH$. The plutonium hydroxide contained in the residue was dissolved by treating the residue for one hour with 8 milliliters of 1 N $HNO_3$. The precipitates and solutions obtained in the various steps of this experiment were assayed by radiometric methods; the results are shown in the following table.

Table

| Substance | Counts/min. of Pu | Percent of Pu |
|---|---|---|
| Original solution | 101,400 | 100.0 |
| Supernatant from $Bi(OH)_3$ precipitation and wash | | 0.5 |
| Supernatant from $Na_2SnO_2$ treatment and wash | 5,800 | 5.6 |
| Extraction with 1 N $HNO_3$ solution | 88,500 | 87.0 |
| Bismuth residue | 7,000 | 6.9 |

It is to be understood that all matter contained in the above description and example shall be interpreted as illustrative and not limitative of the scope of this invention and it is intended to claim the present invention as broadly as possible in view of the prior art.

What is claimed is:

1. The process of separating plutonium from bismuth in a composition of bismuth hydroxide and plutonium hydroxide, which comprises reducing the bismuth to the metallic state by means of a reducing agent having a potential between 0.46 and 2.64 volts in aqueous alkaline solution to reduce bismuth hydroxide but not plutonium hydroxide, and dissolving the plutonium hydroxide by a solvent selected from the group consisting of dilute mineral acids, a mixture of sulfur monochloride and chlorine, and carbon tetrachloride whereby the plutonium hydroxide but not the bismuth metal is dissolved.

2. The process of separating plutonium from bismuth in a composition of bismuth hydroxide and plutonium hydroxide, which comprises reducing the bismuth to the metallic state by means of a reducing agent having a potential between 0.46 and 2.64 volts in an aqueous alkaline solution, and treating the plutonium hydroxide-bismuth metal composition thus formed with a dilute inorganic acid whereby the plutonium hydroxide but not the bismuth metal is dissolved.

3. The process of claim 2 in which the reducing agent is hydroxylamine.

4. The process of claim 2 in which the reducing agent is a soluble stannite.

5. The process of claim 2 in which the reducing agent is sodium stannite.

6. The process of claim 2 in which the solvent is a dilute mineral acid.

7. The process of claim 2 in which the solvent is dilute hydrochloric acid.

8. The process of claim 2 in which the solvent is dilute sulfuric acid.

9. The process of claim 2 in which the solvent is dilute nitric acid.

10. The process of claim 2 in which the solvent is an aqueous solution between 1 and 2 N in $HNO_3$.

11. The process of separating plutonium from bismuth in a composition of bismuth hydroxide and plutonium hydroxide which comprises reacting bismuth hydroxide with sodium stannite whereby the bismuth is converted to the metallic state, and leaching the plutonium hydroxide from the composition of metallic bismuth and plutonium hydroxide with an aqueous solution between 1 and 2 N in $HNO_3$.

No references cited.